Nov. 17, 1953    D. E. CLOUD ET AL    2,659,562
METHOD AND APPARATUS FOR DEPOSITING
A WEIGHED FILL IN A RECEPTACLE
Filed Jan. 31, 1950    4 Sheets-Sheet 1

INVENTORS.
William S. Cloud &
Donald E. Cloud.
By:- Louis Robertson   Atty.

Nov. 17, 1953
D. E. CLOUD ET AL
2,659,562
METHOD AND APPARATUS FOR DEPOSITING
A WEIGHED FILL IN A RECEPTACLE
Filed Jan. 31, 1950
4 Sheets-Sheet 2
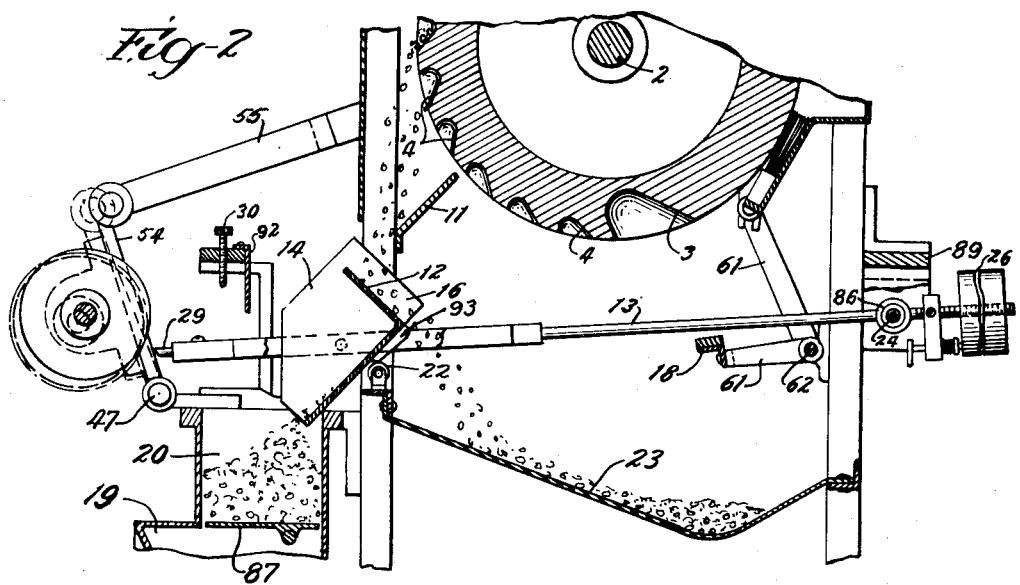
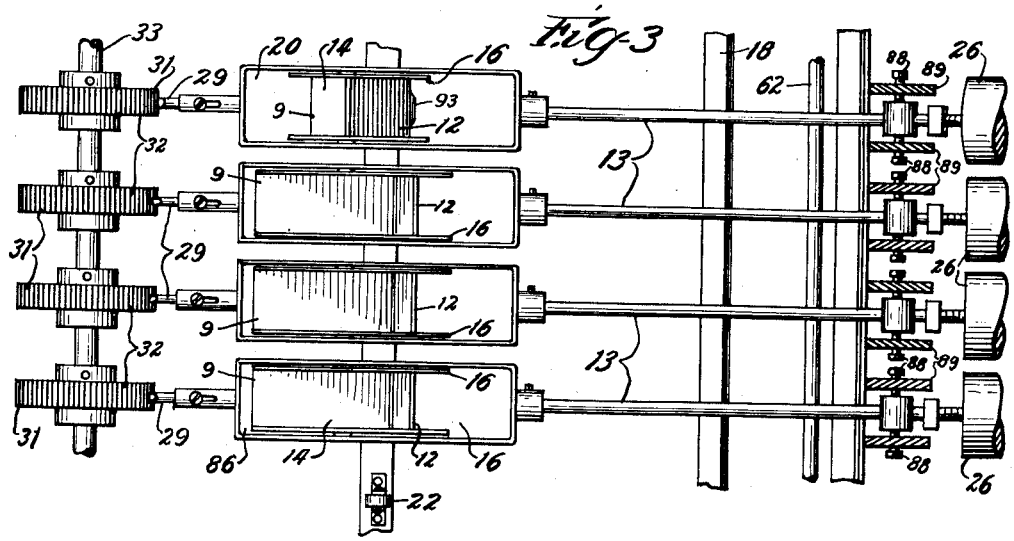
INVENTORS,
William S. Cloud &
Donald E. Cloud
By:- Louis Robertson    Atty.

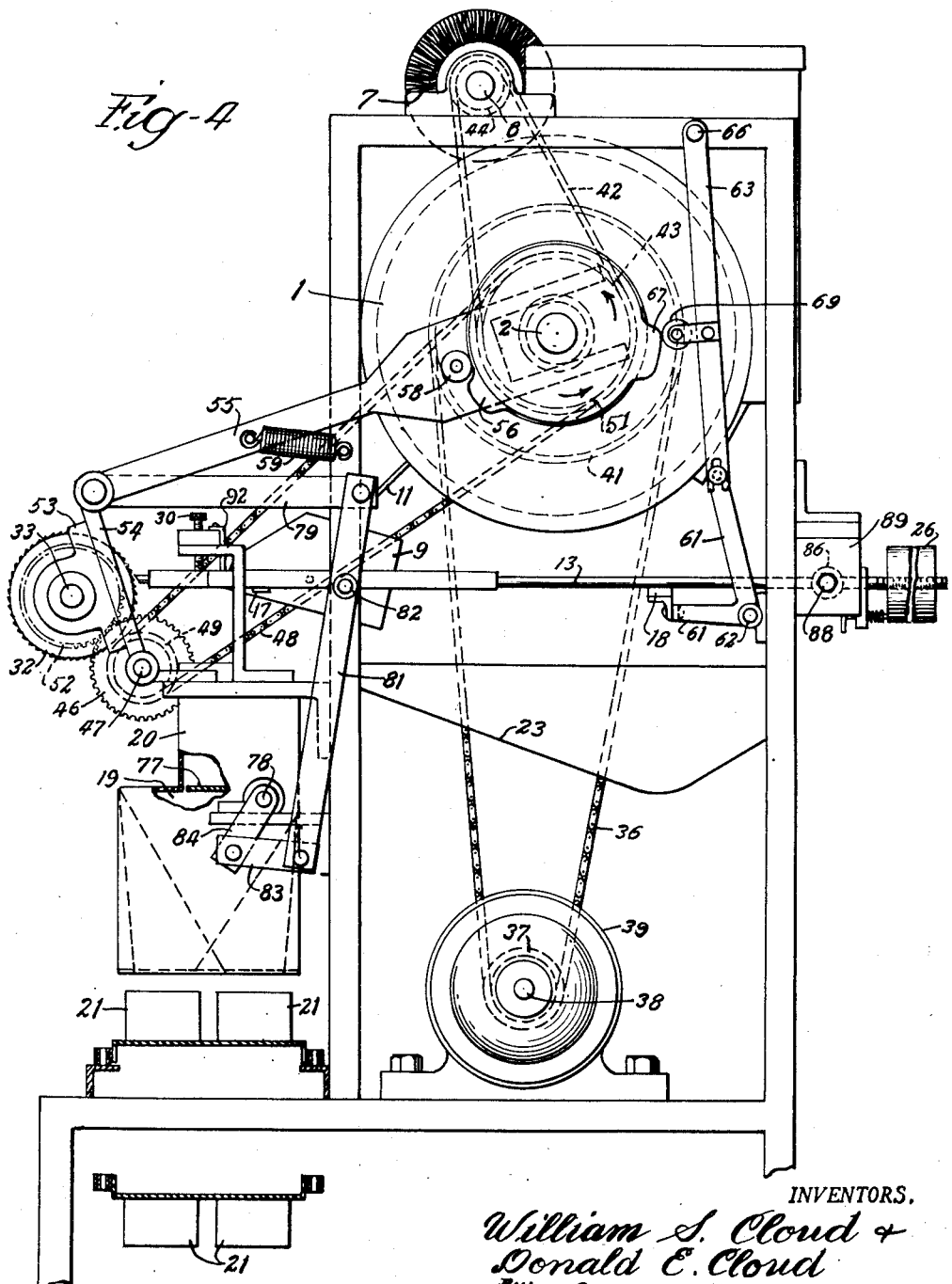

Nov. 17, 1953　　　D. E. CLOUD ET AL　　　2,659,562
METHOD AND APPARATUS FOR DEPOSITING
A WEIGHED FILL IN A RECEPTACLE
Filed Jan. 31, 1950　　　　　　　　　　　　4 Sheets-Sheet 4
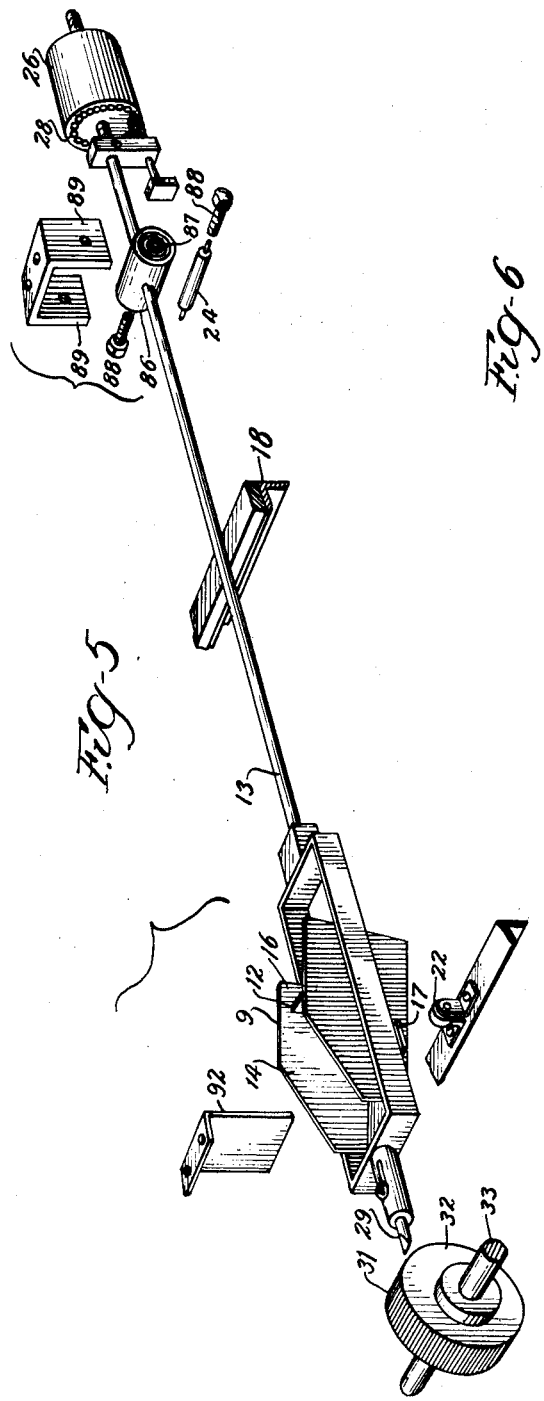
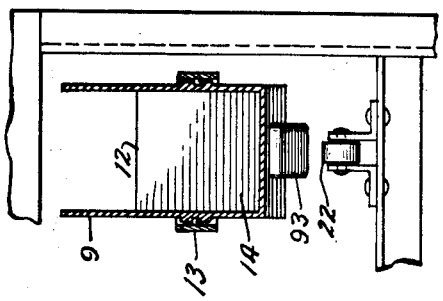
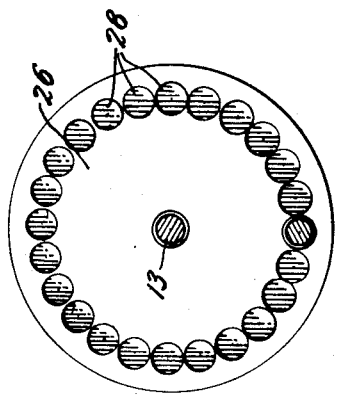
INVENTORS.
William S. Cloud &
Donald E. Cloud.
By:- Louis Robertson Atty Patented Nov. 17, 1953

2,659,562

UNITED STATES PATENT OFFICE 2,659,562

METHOD AND APPARATUS FOR DEPOSITING A WEIGHED FILL IN A RECEPTACLE

Donald E. Cloud and William S. Cloud, Wilmette, Ill.; said Donald E. Cloud assignor to said William S. Cloud Application January 31, 1950, Serial No. 141,522

11 Claims. (Cl. 249—1)

This invention relates to a new and improved apparatus for depositing in a receptacle a fill of predetermined weight.

Although the invention is illustrated and described herein as relating to the packaging of nuts, it should be understood that this is illustrative only and that the principles of the invention can be applied to any fill which will flow by gravity and which is small enough to be contained entirely within the pockets on the filling drum, whether the fill be a powdery substance such as sugar, soap chips or the like or small particles such as nuts, pieces of popcorn or the like, or even a liquid.

Several methods and machines have already been proposed for making up a fill to a predetermined weight by a weighing process and depositing it in a receptacle. None appear to provide a fast, accurate machine suitable for a production line.

The present invention accomplishes this with the aid of a filling drum which initially feeds an almost complete fill and then dribbles small additions thereto. A scale weighing the accumulated fill trips a deflector when the right weight has been reached so that thereafter the dribbles are diverted. A quick-acting throwover device ensures accuracy.

While the scale is performing its weighing function it performs no other work and hence has the greatest possible dependability in accurate weighing.

In order to illustrate the respective steps of the invention, the accompanying drawings have been provided in which:

Figure 2 is a similar view of the lower portion of the apparatus seen in Figure 1 illustrating the releasing of the weighed-out fill.

Figure 3 is a top view of several of the balance beams and associated parts, some details being omitted for clarity, the weighing bucket uppermost on the sheet being in emptying position, the others in receiving position.

Figure 4 is a side elevation of the apparatus illustrating the motivating means.

Figure 5 is a perspective exploded view of the balance beam and associated parts.

Figure 6 is a detail sectional view through the weighing bucket, taken approximately on the line 6—6 of Figure 1.

Figure 7 is an end view of a beam weight.

Figure 1:
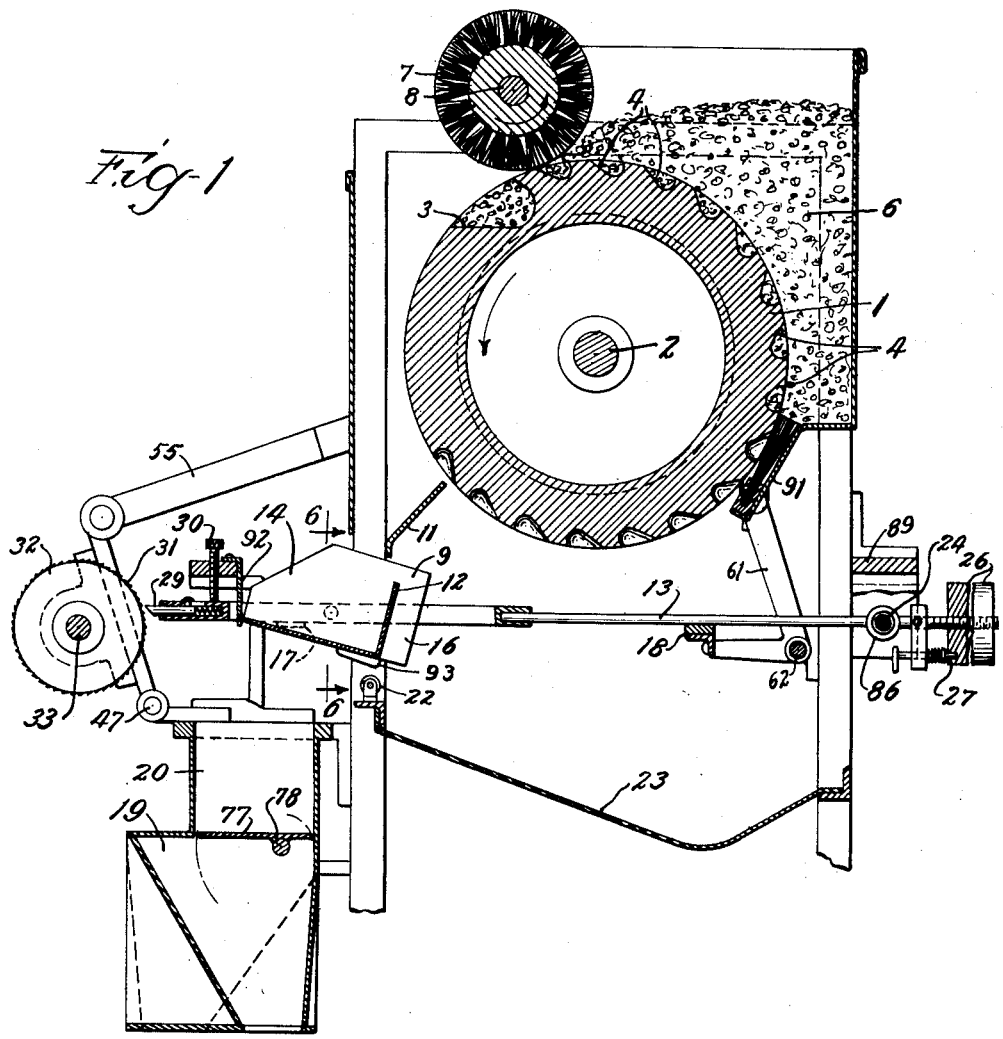
Figure 1 is a fragmentary view of an apparatus for practicing the invention, shown mainly in vertical section, some details being omitted for clarity.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

General description

Referring to Figure 1, a filling drum 1 is mounted on and turned by shaft 2. One or more series of recesses or pockets are provided in the surface of filling drum 1, only one being in the section chosen for the drawings. Preferably the first pocket 3 of each series is of such size that when levelly filled the fill therein will weigh just short of the desired weight, and each of the remaining pockets 4 are of such size that when levelly filled the fill of each pocket will be a fraction of the difference between the weight of the fill of the first pocket and the desired weight but the total weight of the fill of all the remaining pockets will be enough more than said difference to allow a safe margin in case the fill is of exceptionally low density.

All of the pockets are so shaped that as the rotation of filling drum 1 carries them by hopper 6 they will pick up and retain a fill which is leveled by brush 7 mounted on shaft 8. Further rotation of filling drum 1 permits the fill to fall into weighing pan or bucket 9 positioned beneath each series of pockets. To ensure that the fill will drop into bucket 9, a downwardly sloping shelf 11 may be provided. However, the bottoms of the pockets are sloped rearwardly enough to empty the pockets at a high enough point so that the fill will mostly fall directly into bucket 9.

Bucket 9 is provided with a back or divider 12 and is pivotally mounted on balance beam 13 well in advance thereof so that the fill will automatically tend to center near the rear of weighing compartment 14 so as not to dump it prematurely. The material falls uniformly enough to minimize any inaccuracy in weighing which varying positioning of the fill in the weighing compartment might cause. This centering action may be furthered by biasing downwardly to the position shown the rear of compartment 14 by side wall extensions 16. It is desirable to provide stop 17 so the bucket will always come to rest in the same position. The long weighing beam 13 makes slight changes in the position of the center of gravity of the load relatively unimportant. Preferably a temporary support 18 is provided to prevent premature tilting of the balance beam by the momentum of the large fill from first pocket 3.

Rotation of filling drum 1 permits the large fill of first pocket 3, which approximates the desired weight, to fall by gravity into weighing compartment 14. To this is added the dribbles from the successive remaining pockets 4 until the total fill in the weighing compartment tilts the balance beam downwardly so that roller 22 rocks bucket 9 to spill the weighed fill. The structure may be such that this fill will pass immediately down chute 19 into receptacles 21 positioned therebelow, or an intermediate bin or holding compartment 20 may be provided as illustrated. The bin 20 is preferred when accurate timing of the release of the fill is desired for any reason. Receptacles 21 could be the receptacles ultimately to be filled, but have been shown as part of a conveyor.

After the beam 13 tips and bucket 9 swings to the spilling position, the dribbles from subsequent pockets 4 fall on divider 12, now swung to a downward and rearward angle as shown in Figure 2, and pass down between side wall extensions 16, down chute 23 to a storage bin (not shown) from which they can be returned to hopper 5 by any desired means.

Accuracy and speed in weighing are dependent to a large extent upon the speed with which the delivery of material to the weighing compartment is interrupted after the fill is heavy enough to tilt the scales. Several features of the apparatus are directed toward attaining the desirable speed. One feature is the positioning of weighing bucket 9 on balance bam 13. Balance beam 13, pivotally mounted on pivot 24, has counterweight 26 mounted close to the pivot point and weighing bucket 9 mounted as far away from the pivot point as is convenient in the design of the apparatus. Counterweight 26 preferably is screwed onto balance beam 13 and held by spring-urged pin 27 applied to the appropriate recess 28 in its end, so that a delicate adjustment may be maintained. Thus, balance beam 13 itself will react very quickly to the desired weight of fill. An additional feature is the provision of means for throwing balance beam 13 downwardly as soon as it commences to tilt. The least tilting of balance beam 13 causes knife tip 29, yieldably mounted at the end of beam 13 and positioned by thumb screw 30, to engage teeth 31 of wheel 32, rotating on shaft 33, which throws balance beam 13 downwardly faster than it would pivot due to gravity alone, to prevent additional fill from remaining pockets 4 from falling into weighing bucket 9.

At the end of each weighing operation wheel 32 is swung away from balance beam 13 so that counterweight 26 can position it for the next weighing operation.

If more fills are required than can thus be weighed out with one balance beam, a plurality of independently-acting balance beams 13 and associated parts in side by side relationship can be provided, as is best illustrated in Figure 3. A single filling drum 1 may have a series of pockets over each balance beam 13.

Drive mechanism

The apparatus, as best illustrated in Figure 4, is shown driven from a single motor by a series of chains. Modifications whereby several motors, belts or gears are provided are within the scope of the invention.

Drum 1 is shown driven in a counter-clockwise direction by chain 36, passing around sprocket 37 mounted on shaft 38 of motor 39 and sprocket 41 mounted on shaft 2.

Brush 7 is driven in a counter-clockwise direction by roller chain 42, passing around sprocket 43 mounted on shaft 2 and sprocket 44 mounted on shaft 8.

Gear 46, mounted on shaft 47 and driven in a counter-clockwise direction by chain 48, passing around sprocket 49 mounted on shaft 47 and sprocket 51 mounted on shaft 2, meshes with gear 52 mounted on shaft 33 to drive toothed wheel 32 in a clockwise direction.

Shaft 33 is mounted in bearing blocks 53 mounted on lever arm 54 which is pivotally mounted on shaft 47 and may be oscillated by bifurcated lever 55 slidably guided by shaft 2. The outwardly swinging action of wheel 32, described above, which allows balance beam 13 to be repositioned for the following weighing operation, is caused by the action of cam 56 on cam follower roller 58 mounted on lever 55. Wheel 32 is returned to position for the following weighing by spring 59, biasing lever 55 inwardly.

Support 18 may be swung upwardly at the appropriate time to provide support for balance beam 13, as described above. To this end bell crank lever 61 carrying support 18 and pivotally mounted on shaft 62 is pivoted to swing holder 18 up to supporting position by the outward movement of lever arm 63, with which it has a bifurcated connection. Lever arm 63, pivotally supported by pin 66 mounted on the frame, is moved outwardly by the action of cam 67, rotating with shaft 2, on cam follower 68, mounted on lever arm 63. A soft pad is on support 18.

If a holding bin 20 is desired, its bottom 77 mounted on shaft 78 may be pivoted to empty the bin by the outward motion of bifurcated lever 55, described above, acting through lever arm 79 and lever arm 81 which is pivotally supported by pin 82 mounted on the frame and connected with shaft 78 by lever arms 83 and 84. This permits accurate timing of the discharge, a feature especially desirable for discharging into a conveyor when its receptacles are properly positioned.

Further details

As seen in Figure 5, balance beam 13 may be supported by sleeve 86 which may be pivoted by bearings 87 in its opposite ends. These bearings may be ball bearing units with the inner races pressed on pivot 24 reduced at both ends to fit in bearing cups formed by screws 88. Screws 88 are adjustable in brackets 89 to have a smooth bearing engagement with pivot 24. Both this bearing and the ball bearing must fail before any great inaccuracy results. The parts of beam 13 extending in opposite directions from sleeve 86 may be welded in recesses in the sleeve.

A seal for the bottom of bin 6 may conveniently be formed by a brush 91 as shown in Figures 1 and 2.

A guard plate 92 may be positioned in front of bucket 9, but not quite touching it, to stop the occasional nut or the like which might otherwise bounce out of the bucket.

Smooth tipping action of bucket 9 as it is lowered against roller 22 may be ensured by placing a block 93 to roll on roller 22.

An important feature of the invention is the fact that the scale is afforded the utmost dependability because of the fact that the weight of the material in the scale pan 9 is not required to perform any work other than overcoming the biasing means, namely weight 26. Even the operation of a switch by the weight of the material can introduce variables making the weighing operation less dependable. The material in the pan merely moves a key member (knife tip 29) into the orbit of a constantly moving trip device (wheel 32) which, thus effectuated, performs all the necessary work of actuating the stop device (divider 12) to instantly prevent further delivery to the pan and operating the pan to spill the weighed out material from the pan. Other feed and delivery, weighing, trip, keying and stop devices could be used without discarding the general combination, although the specific forms have advantages. For example, in delivering the stream of material to the pan, the drum feeder 1 is better than prior feeders because it permits accurate control and variation of the delivery speed. With less exact control erratic surges would be likely to cause excesses in the final weight, especially if the maximum desired speed were normally maintained. The drum feeder also lends itself readily to provision of a plurality of side-by-side scales.

At the present time twelve scales are used, and twenty will be provided in the next machine. Each of them fills a separate holding bin 20. All of these holding bins are dumped simultaneously to fill the same number of receptacles 21 on the conveyor. The conveyor may move continuously if the receptacles are reasonably longer lengthwise of the conveyor than the corresponding dimension of the chutes 19. The conveyor may dump the successive receptacles into a bag filling spout with accurately timed intervals by passing around a small sprocket. The two lines of receptacles 21 are staggered so that if they deliver to the same spout the timing is still uniform. With uniform timing a good operator can apply the bags to receive 60 charges a minute.

With some materials (such as granulated sugar) the successive increments of material would be uniform enough so as to amount to a uniform stream and provide uniform fills if the timing of the interruption is uniform. With nuts, however, each smaller pocket 4 may hold only one nut and these would vary in size, and exceptionally large ones might even be brushed out by brush 7. Accordingly it is preferred to so space the pockets 4 that the weighing and the flipping of divider 12 can be completed between the falling of charges from adjacent pockets 4. The quick acting tripping mechanism permits these pockets to be quite close together. The frequency with which gates 77 are opened must be timed for the slowest instances of filling holding bins 20. Hence the dependability of drum 1 and the speed of the tripping mechanism combine to permit a high frequency of cycles of the machine to yield a substantially higher speed than was formerly believed possible with equal accuracy. This is especially important where a multiplicity of weighing units is combined with a jointly timed release (for example, to fill the receptacles on one conveyor).

The brush 7 is preferably adjustable toward or from the drum 1 to vary the quantity of fill. The draftsman has shown it somewhat to the left of its preferred position, which is at the top of drum 1. Any convenient means for agitating the material in hopper 6 may be provided, such as sinuous wires extending around and carried by drum 1 between the various series of pockets, none showing in the plane of Figure 1 which is through one series of pockets.

When large nuts or pieces of material are present, it may be desired to have the smaller pockets or the later ones thereof offset from the main pockets axially of the drum and pass by or through a different hopper with smaller pieces of material so that there will be less overweight. When just a few large articles are to be packaged, the main or first pocket need not be larger than the others.

The pan 9 may hang freely from the weighing beam 13 during weighing if desired for more certain or obvious accuracy, although the illustrated arrangement is accurate according to present standards.

In the illustrated apparatus support 18 is effective only at the time the first fill is deposited in pan 9. With other heavier articles, such as oranges, or even with some of the heavier varieties of nuts, it may be desirable to have support 18 effective momentarily at the time each fill is deposited. This may be accomplished by the provision of additional, appropriately placed risers on cam 67.

We claim:

1. Apparatus for weighing out a predetermined weight of material including a scale having a pan, means for biasing the pan to a predetermined weighing position, means for delivering material to said pan with small increments as the predetermined weight is approached, said apparatus also including a deflector having a deflecting position for diverting the delivery of material to exclude it from the pan, trip means constantly moving but normally ineffective and rendered effective upon initial movement of the pan to trip said deflector to said deflecting position, said pan being free to make said initial movement without performing any work other than overcoming said biasing means.

2. Apparatus for weighing out a predetermined weight of material including a scale having a pan, means for biasing the pan to a predetermined weighing position, means for delivering material to said pan with small increments as the predetermined weight is approached, said apparatus also including a deflector having a deflecting position for diverting the delivery of material to exclude it from the pan, trip means constantly moving but normally ineffective and rendered effective upon initial movement of the pan to trip said deflector to said deflecting position and empty said pan, said pan being free to make said initial movement without performing any work other than overcoming said biasing means.

3. Apparatus for weighing out a predetermined weight of material including a scale having a pan pivoted thereto, means for biasing the scale to move the pan to a predetermined weighing position, means for delivering material to said pan with small increments as the predetermined weight is approached, said pan including a deflector which, in deflecting position, diverts to discharge material approaching the pan, trip means constantly moving but normally ineffective and rendered effective upon initial movement of the pan to trip said pan to spill its contents and move the deflector to said deflecting position, said pan being free to make said initial movement without performing any work other than overcoming said biasing means.

4. Apparatus for weighing out a predetermined weight of material including a scale having a pan pivoted thereto, means for biasing the scale to move the pan to a predetermined weighing position, means for delivering material to said pan with small increments as the predetermined weight is approached, said pan including a deflector which, in deflecting position, diverts to discharge material approaching the pan, trip means normally ineffective and rendered effective upon initial movement of the pan to trip said pan to spill its contents and move the deflector to said deflecting position.

5. Apparatus for weighing out a predetermined weight of material including a scale having a pan, means for biasing the pan to a predetermined weighing position, means for delivering material to said pan with small increments as the predetermined weight is approached, said apparatus also including stop means having a stopping position for stopping the delivery of material to the pan, and trip means constantly moving but normally ineffective and rendered effective upon initial movement of the pan to trip said stop means to said stopping position, said pan being free to make said initial movement without performing any work other than overcoming said biasing means.

6. Apparatus for weighing out a predetermined weight of material, said apparatus including a scale having a pan, means for biasing the pan to a predetermined weighing position, means for delivering the material to said pan with small volumetrically measured increments as the predetermined weight is approached, said apparatus also including stop means having a stopping position for stopping the delivery of material to the pan, and trip means constantly moving but normally ineffective and rendered effective upon initial movement of the pan to trip said stop means to said stopping position, said pan being free to make said initial movement without performing any work other than overcoming said biasing means.

7. A weighing machine including a scale having a free-weighing beam, a key carried by the beam, and a constantly rotating member having projections thereon rotating in an orbit positioned adjacent to the key and moving in the direction to move the beam in the direction it is moved by that which it weighs, and effective upon initial movement of the beam to engage said key to take control of said beam and move it further.

8. A weighing machine including a scale having a free-weighing beam, a key movable with the beam, and a constantly rotating member having projections thereon rotating in an orbit positioned adjacent to the key and moving in the direction to move the beam in the direction it is moved by that which it weighs, and effective upon initial movement of the beam to engage said key to take control of said beam and move it further; said key being yieldably carried by said beam.

9. A weighing machine including a scale having a free-weighing beam, a key carried by the beam, a constantly rotating member having projections thereon rotating in an orbit positioned adjacent to the key and moving in the direction to move the beam in the direction it is moved by that which it weighs, and effective upon initial movement of the beam to engage said key to take control of said beam and move it further and means for separating said rotating member and said key to permit said beam to return to the starting position.

10. A weighing machine including a scale having a free-weighing beam, a key carried by the beam, a constantly rotating member having projections thereon rotating in an orbit positioned adjacent to the key and moving in the direction to move the beam in the direction it is moved by that which it weighs, and effective upon initial movement of the beam to engage said key to take control of said beam and move it further and a weighing pan pivoted to said beam and means for obstructing the movement of part of said pan to tilt it more than the tilting of the beam and spill the contents therefrom.

11. A weighing machine including a scale having a free-weighing beam, a control member to be operated when a predetermined weight is reached, a constantly rotating member having projections thereon, and a key positioned during weighing adjacent to the orbit of the projections, carried by the beam and movable by initial movement of the beam into said orbit to render one of said projections effective for operating said control member.

DONALD E. CLOUD.
WILLIAM S. CLOUD.

References Cited in the file of this patent

UNITED STATES PATENTS

| Number | Name | Date |
|---|---|---|
| 559,746 | Richards | May 5, 1896 |
| 586,458 | Secor | July 13, 1897 |
| 643,102 | Bates | Feb. 13, 1900 |
| 928,658 | Hoyt | July 20, 1909 |
| 1,259,836 | Close | Mar. 19, 1918 |
| 1,867,442 | Decker | July 12, 1932 |
| 2,260,691 | Popov | Oct. 28, 1941 |

FOREIGN PATENTS

| Number | Country | Date |
|---|---|---|
| 665,292 | France | May 6, 1929 |
| 356,015 | Great Britain | Sept. 3, 1931 |
| 492,634 | Great Britain | Sept. 23, 1938 |